Aug. 1, 1950

M. D. LISTON 2,517,121

AUTOMATIC SPECTROPHOTOMETER

Filed June 3, 1947

Inventor

Max D. Liston

By Spencer, Willits, Helwig & Baillie

Attorneys

Patented Aug. 1, 1950

2,517,121

UNITED STATES PATENT OFFICE 2,517,121

AUTOMATIC SPECTROPHOTOMETER

Max D. Liston, Wilton, Conn., assignor to General Motors Corporation, Detroit, Mich., a corporation of Delaware Application June 3, 1947, Serial No. 752,120

13 Claims. (Cl. 250—43)

My invention relates to improvements in means for measuring the relative radiant energy from a source as a function of the wave length, or what are known as spectrophotometers for quantitative analysis work.

While spectrophotometry is in general a wellknown art, the means utilized heretofore have had many limitations, one of which has been, that, since the amount of energy which reaches the detecting device is exceedingly small, a very sensitive galvanometer was used therewith, which was actuated by the output of the thermopile or other sensitive pick-up means. The currents available being very small, the sensitive galvanometers indicating the same were adversely affected by mechanical vibration in the vicinity of the measurements. A satisfactory direct current amplifier has, however, been recently developed, and is used in my general system. This amplifier, while itself forming no part of my invention, in combination with other elements forms novel means. This D. C. amplifier is disclosed in a patent issued to Sargeant and Hoeper #2,413,788, issued January 7, 1947. The use of this amplifier so increases the power of the currents involved that a recording meter may now be used in the place of the sensitive galvanometer.

In equipment of this type it is a very great aid to produce some permanent record of the results of the measurements and to have this record visible as it is made and immediately available to the operator upon its completion. This was, of course, not practical with the galvanometer, but the recorder now provides such a permanent and immediately available record. A D. C. system of this type provides great sensitivity and high speed response to signal. It has, however, one disadvantage, and that is that it is subject to drift, but this is minimized in the present case by certain features to be described.

In a spectrophotometer, maximum resolution is necessary to provide accurate measurements. This means that a portion of the spectrum falling on the sensitive receiver at any one time must include as short a wave length range as possible so that features of the spectrum which are close together in terms of wave length may be shown separately on the record and not be confused by overlapping. Resolution is primarily controlled by varying the width of the slits in the spectrophotometer, but this slit width also controls the energy passed through the instrument to the detecting means and this cannot be made too small lest the indications of features of the spectrum become less than the existing random disturbance, or noise in the system. Thus the slit adjustment is at all points in the spectrum a compromise between resolution desired and energy available.

An object of my invention is to provide an automatic spectrophotometer that provides a permanent and immediately available record of the results obtained by scanning the spectrum.

It is a further object of my invention to provide a spectrophotometer that maintains maximum resolution in all parts of the spectrum.

It is a still further object of my invention to provide a spectrophotometer that automatically adjusts the energy passage controlling means as the spectrum is scanned.

It is a still further object of my invention to provide a spectrophotometer system which is a null system, and balances at different timed steps and is automatically corrected for zero flow at these stages.

It is a still further object of my invention to vary the energy entering the spectrophotometer periodically during the recording of a spectrum to compensate for changes in energy emitted by the source in different parts of the spectrum.

It is a still further object of my invention to provide means to adjust controlling slits periodically during the recording of the spectrum so that in each part the resolution obtained is as large as consistent with the energy available from the source in that part of the spectrum, the adjustment means being automatic and in accordance with a preselected program.

It is a still further object of my invention to provide means to preselect the points in the spectrum where the recording will begin and end and the automatic periodic adjustment of slits between these limits being accomplished by remote electrical means without any direct mechanical connection.

With these and other objects in view which will become apparent as the specification proceeds, my invention will be best understood by reference to the following specification and claims and the illustrations in the accompanying drawings, in which:

The figure shows a schematic wiring diagram of a system embodying the details of my invention.

In this figure the source of radiant energy 2, which provides the beam of rays which are to be projected through the sample 4, may be of any sort of relatively brilliant constant illumination. In the present case, there is used what is known as a Nernst glower, which projects a beam through said sample 4, which may be of any material which it is desired to examine and test, through an adjustable slit 6, and onto one side of the prism 8, the prism, of course, refracting and breaking up the beam into a spectrum. These rays then proceed through a second adjustable slit 10, and impinge upon the pick-up means which is a thermopile 12. The two adjustable slits 6 and 10 are connected to be simultaneously adjusted as shown by dotted lines, and thence through a further dotted line indicated as 14 down to a small motor 16, so that the widths of these slits may be varied, depending upon the circumstances of the test. The motor 16 is provided to drive the change width mechanism for these slits as the occasion arises, and is controlled by a system to be described.

Between the source 2 and the sample 4, there is provided a shutter 18, which is operated by rack 20, and a solenoid coil 22, which coil is connected through line 24 back to an electronic timer control 26, which contains a number of program sequence timed switches whose specific construction is not necessary to the understanding of my invention, but which, when operated in this instance, causes the shutter 18 to flip up and intercept the rays from the source 2 for various adjusting purposes.

The output of the thermopile 12 flows through line 28 to a mechanical contact modulated amplifier 30 of the type disclosed in the Sargeant and Hoeper patent above referred to. The opposite side of the thermopile is, in like manner, connected through line 32, and a plurality of resistances 34, 36 and 38 in series, and thence to the other terminal of the input of the amplifier. A line 40, extending from the junction of the resistors 36 and 38 extends up to one pole of a small battery 42, the opposite pole of which is connected to an adjustable switch contact 44, which may be placed in contact with any one of a series of parallel resistors 46, 48, 50 and 52, all of which have their opposite terminals connected to a line 54, which joins the connection between the resistor 38 and the amplifier 30. Line 40 also extends to a small battery 56, which is in turn connected to a resistor 58, the opposite terminal of which is connected to an adjustable tap 60 on resistance 62, which is connected directly in shunt across resistances 36 and 38. The adjustable contact 44, which cooperates with the various resistances 46 through 52, is for the purpose of applying test signals to the amplifier in order to adjust the same. The purpose of the adjustable tap 60, which cooperates with the resistance 62, is to balance the bridge or zero the system at each variation or re-setting of the device, and it is driven by a zeroing motor 64, as shown by the dotted line connection between the two.

In the output of the amplifier 30, there are connected means for controlling the speed of response of the signal to the recorder, and these involve, in one of the output lines, a pair of resistances 66 and 68 in series, the most remote contact of the last resistance 68 being connected to a conductive control line 70. The opposite terminal of the output of the amplifier 30 is connected to line 72, which is grounded as shown. A series of condensers 74, 76, 78 and 80 have one terminal connected to this line, and the opposite terminal connected to a stationary contact which is adapted to cooperate with a movable tap contact member 82. This is in turn connected to a point between the two resistances 66 and 68, and also to one terminal of a resistor 84. Contact 82 may, therefore, be moved back and forth to include various amounts of capacity in the system. Resistor 84 is engaged by an adjustable tap 86, which is connected in turn to line 88, which is connected to a stationary contact 90, cooperating with an adjustable contact 92, the latter being moved by a mechanical rod 94, whose movement is again controlled by the electronic timer 26. This is accomplished by a small solenoid coil 96, whose energization is controlled by said timer.

The lines 70 and 72 forming the output of the amplifier 30 are connected to two lines 98 and 100, which are the input to a recorder amplifier 102, which together with other elements is the rugged recorder referred to previously and which produces the visible and permanent record of the results of the test. This recorder includes a balancing motor 104, which operates the recording pen 106, as shown by the dotted line, said pen engaging a continuously driven paper 108, providing a chart or graph. A drive for the paper chart is indicated as 110, and receives its power from line 112 and the electronic timer control. The motor 104 also drives a small generator 114, which may be termed the anti-hunt generator, and to one of whose output terminals is connected resistance 116, in series with a resistance 118, the latter being a variable resistance, and having a tap 120 thereon, which is connected to line 122 extending to a junction with line 70. The opposite side of the generator is connected through line 124 directly to line 72. A condenser 126 is connected from line 124 to the junction point between the two resistances 116 and 118.

Motor 104 also drives one additional member, which is the adjustable balance tap 128 for the recorder, which engages a resistance means 130, which is connected in series with battery 132, and a second resistance means 134. A ground is connected between resistor 130 and the battery 132. This latter also has an adjustable tap 136, which is directly connected back to complete the series circuit with the opposite end of resistance 130. As the tap 128 moves along the surface of the resistance or slide wire 130, the recorder is balanced. The movement of the tap 136 along its resistance 134 is an initial or coarse adjustment of gain. Adjustable tap 128 is connected through line 138 with a second adjustable tap 140, contacting resistor or slide wire 142 for so-called fine gain adjustment, whereas 136 and 134 variation was for coarse gain. Resistance 142 is connected through line 144 to the movable contact 92 previously mentioned.

The motor 104 is of a reversible type, and is capable of rotation in either direction, being controlled by switches 146–148, which are included between lines 150 and 152. The movable switch arm 146 is rigidly secured to the rod 94, so that this switch is actuated simultaneously with movable switch arm 92. In the opposite positions, switch arm 146 engages contact 154 and thus controls the energization of the zeroing motor 64, previously described. Motor 104 is controlled in addition by the electronic timer control through line 156. One other switch is actuated by movement of the arm 94, and that is the movable switch arm 158, which engages stationary contacts 160 and 162. This movable arm is connected to line 164, which extends to line 70. Stationary contact 160 is connected through line 166 to adjustable tap 168, engaging resistor 170, and contact 162 is connected through line 172 to adjustable tap 174, slidably engaging resistor 176, the latter being directly connected to the opposite end of resistor 170 and to line 72. Slidable contact 174 is mechanically ganged to move with slidable contact 136, as shown by the dotted line connection between the two. The sliding contact 174 is provided to adjust the dead spot control for the recorder, and adjustable contact 168 is provided for the so-called zeroing dead spot control, during the zeroing operation.

In order to scan through the spectrum the prism 8 is placed so that one end of said spectrum is focused through the slit 10 onto the thermopile, and then the mechanism is set in operation, the prism being driven or turned very slowly so that the full gamut of the spectrum will be allowed to pass through the slit 10 as the prism rotates. The prism drive is provided by motor 178, as shown by the dotted line connection to the prism, and this motor simultaneously turns a number of other devices, the first being a commutator 180 for switching, the second a pulse generator 182 for providing time signal pulses on the record and also a triggering pulse for actuation of the system which will be explained more in detail later, the third and last being a commutator switching means 184 for prism limit control, which prevents the same from going beyond the pre-determined limit. This last means is connected by line 186 with the prism motor control 188, the other control means for this member being the electronic timer control which exerts its influence through line 190 to the prism motor control 188, the output flowing through line 192 to the motor per se.

The movable or sweeping portion 194 of the commutator slit control is connected through line 196 to a stationary contact 198 of a switch, the setting of which determines whether the operation of the system shall be automatic or manual. As the member 194 sweeps around the various contacts 200, it brings into the circuit various adjustable potentiometers 202, 204, 206, etc., through various conducting lines 208, 210, 212, etc. These adjustable potentiometers having taps 214, 216 or 218, which may be moved up and down, can be pre-set so that when brought into the circuit they will cause the slit motor to balance at different pre-determined mechanical positions, depending upon their setting. One terminal of each of the resistors 202, 204, 206, etc., is connected to line 220, which terminates in an adjustable contactor 222 which engages a series of fixed contacts between a plurality of series resistors 224, 226, 228, and 230. The first of these resistors 224 is connected to a line 232. These series resistors form a step resolution control for the whole system. The opposite terminals of the various potentiometers are connected to line 234. Connected across between lines 232 and 234 in parallel relation are a pair of resistors 236 and 238 and a battery 240. A variable tap 242 engaging resistor 236 is connected through line 244 to stationary contact 246, and an adjustable tap 248, which engages resistance 238 in a similar manner, is connected directly into a modulated D. C. amplifier 250. These resistors form a balanced bridge for the amplifier input when the system is being operated manually without the automatic program means for changing the slit widths for resolution. When the automatic program means is in circuit the balancing bridge circuit is formed of resistance 238 and one of the resistances 202, 204. A manually movable switch contact 252 can be moved back and forth to engage either contact 198 or 246, and is connected through line 254 to the input of the amplifier 250. This switch determines whether the device is operating on a fixed manual adjustment or the automatic program.

The output of the amplifier 250 has one of its terminals connected through lines 256 and 258 to one of the windings 260 of the motor 16, the opposite terminal of the winding being connected through line 262 to two movable switch arms 264 and 266, the first of these switches 264 being a manually operated switch normally open and the second 266 being an electrical solenoid switch which is closed upon signal from the electronic timer, being operated by solenoid 268. The stationary contacts 270 and 272 which cooperate with switches 264 and 266 respectively are connected directly to line 274, which goes to the amplifier 250. Line 258 also extends to a solenoid actuating coil 276, the opposite terminal of which is connected to a resistor 278 and back to line 274, so that the output of the amplifier may be applied directly across solenoid 276 in series with the resistor 278. This solenoid actuates what is known as a synchronizing relay consisting of two movable contacts 280 and 282, which are moved simultaneously by the actuation of the solenoid 276. The first of these, 280, is connected through line 284 to the pulse generator 182, and the second is connected through line 286, which is not complete in order to simplyify it, to the electronic timer. A line 288 also extends from the pulse generator to the electronic timer control 26. Switch contact 280 provides a circuit for the pulse generated by the pulse generator to trigger the electronic timer to initiate the slit adjustment period as desired at exactly the desired time and contact 282 upon deenergization of solenoid 276 provides a signal to the timer, indicating that the slit adjustment is completed and starting again the scanning process.

In the operation of the device, a continuous beam is projected from the source 2 through a sample 4 of any material which it is desired to test or examine which then impinges upon the first slit 6. It is reduced by this slit to a predetermined desired value, and then impinges upon the prism 8, passing through the prism and being refracted into a spectrum, it falls upon the outlet slit 10, the amount passing therethrough impinging upon the pickup thermopile. As previously mentioned, the prism 8 is so mounted that it may be very slowly rotated about its vertical axis, so that the spectrum will very slowly scan over the slit 10, applying to the thermopile the various wave lengths of the total spectrum utilized. This radiation falling upon the thermocouple pick-up generates energy therein to actuate the recording apparatus 102, 104 and 108 previously described to produce a continuous record. Under these conditions prism rotating motor 178, recorder motor 104 and chart driving motor 110 are energized.

As before mentioned, it is essential to provide maximum resolution for the beams that proceed through the inlet and outlet slits, and, of course, the energy in the beam is also dependent upon its wave length. Thus, the slit would have to be wider at one end of the spectrum to permit a sufficient amount of energy to pass through to provide a satisfactory signal than it would be at some point further along the scanning position. As the amount of energy increases, the slits can be reduced in width, and, therefore, provide better resolution. With my particular system the adjustability of these slits may be automatically carried out in a series of steps. Assuming that a portion of the spectrum is reached which requires either a narrowing or widening of the slits 6 and 10, then it is desired to stop each of the above named motors, make the necessary slit adjustments, and then continue with the recording. In order to make the necessary slit adjustments, a sequence of operations is initiated by commutator 194 and controlled in order by the program electronic timer 126. The various steps in their sequence is as follows:

(1) Commutator 194 reaches a point at which it contacts a new segment to introduce a different control bridge circuit, such, for example, as 218.

(2) This energizes the amplifier 250 which actuates contact 280 through coil 276, which sets the electronic timer in condition for initiation.

(3) The next pulse generated by the pulse generator 182 initiates the electronic timer to carry out its program sequence.

(4) Prism motor 178, recorder motor 104 and chart motor 110 are stopped by the electronic control (not shown in detail).

(5) Shutter 18 is next closed through energization of coil 22.

(6) Slit adjusting motor 16 is energized through energization of coil 268 and by its motion adjusts the size of the slits.

(7) The operation of slit motor 16 simultaneously moves contact 248 on resistor 238 in the bridge circuit until the latter is balanced to a value proportional to the setting on the potentiometer, such as 218. At the same time, of course, the slit width is varied.

(8) Coil 276 now becomes deenergized due to the output of the amplifier 250 becoming zero and switches 280 and 282 open, which through the latter conditions the electronic timer for its next step.

(9) Relay coil 96 is now energized to complete a circuit to zeroing motor 64 to balance the input signal to the amplifier 30 to zero. This operation also opens contact 90 so that no voltage will be applied from potentiometer 128, and thirdly, switches arm 158 from the recorder dead spot control 174 to the zeroing dead spot control 168.

(10) Shutter 18 is now open as coil 22 becomes deenergized.

(11) Recorder balancing motor 104 is now actuated and sufficient time is provided to bring the main circuit into balance.

(12) Prism motor 178 and chart motor 110 are reenergized to again place the system in normal recording operation in which it will continue until it is necessary to again cause adjustment in slit width, due to the introduction of additional potentiometer means set at different values.

The pulse generator 182 also applies a pulse through line 290 to place a mark on the chart 108, identifying certain time intervals or degree marks for rotation of the prism.

In the actual form of the invention as constructed, I have provided fourteen of the potentiometers, which are pre-settable and which are sequentially included in the automatic control circuit by the rotation of the arm 194 of the commutator 180. The various commutator bars may be grouped by bridging the same to maintain one potentiometer setting for as many degrees of rotation as is desired, at which time it can switch to the next potentiometer. In some instances it may be desirable to shift or change the resolution of the whole system for the complete program without changing each of the step settings individually. This is accomplished by a resolution control 222, which introduces series resistance into the bridge circuit by changing its contact position.

Motor 104 is, of course, the recorder motor and is operated by the output of the amplifier 30, which picks up the signal from the thermopile. This motor moves the recording stylus or pen 106 with regard to the chart, and its position is determined by the output of the amplifier. The speed of response of the signal may be varied by moving the contactor 82 to include different ones of the condensers 74 through 80 as the needs require. To initially set the gain, adjustable slide 136 is positioned along resistor 134 until the approximate gain is acquired, and the contactor 140 is adjusted along resistor 142 to complete the setting.

For setting or indexing the device, test signals may be applied either before the recording is started or during the same by contactor 44 being placed on contacts including resistors 46, 48, 50 or 52, depending upon the strength of the desired test signal, which is for the purpose of adjusting the amplifier and the remaining portions of the circuit if necessary.

The main recording motor 104, which operates the stylus 106, simultaneously rotates the generator 114, which applies a signal back to the incoming lines in inverse phase to prevent overshooting. That is, if the signal applied to the recorder amplifier increases rapidly, and the motor 104 speeds up, a voltage will be generated by the generator 114 and applied back to the incoming lines of the recorder in an attempt to prevent a too-sudden rise in the same. This will, of course, minimize the possibility of overshooting. Upon rotation of motor 104, as well as moving the recording pen and operating the anti-hunt generator the same moves the recorder contactor 128 across the slide wire 130 in an attempt to bring back to balance the bridge system to null, as is customary with this type of recorder.

Thus, as the varying degrees of energy fall upon the thermopile, the output thereof is amplified by amplifier 30, which signal is applied to the recorder amplifier 102, whose motor 104 is energized to operate the stylus 106 for tracing a mark upon the chart, provide a re-balance of the bridge system to null and generate an anti-overshoot back voltage. Periodically, as the spectrum is scanned, the commutator 180 inserts a new potentiometer in the bridge controlling the slit adjustment, and this, being triggered by pulse generator 182, causes the motor 16 to be energized to periodically balance its bridge and adjust the width of the slits. At the end of the adjustment, the zeroing motor 64 adjusts its potentiometer to re-balance the system with the shutter closed, and the cycle is repeated.

I claim:

1. In spectrophotometric means, a source of radiation, a prism receiving rays therefrom and refracting the same into a spectrum, thermopile means to receive rays within the spectrum, opaque means having an adjustable opening therein interposed between the prism and the thermopile to meter the rays therethrough, means to rotate said prism so that the spectrum will scan the thermopile, driving means for adjusting the openings in the opaque means, balanced bridge means having a plurality of potentiometers in parallel in one side which are capable of independent operation, switching means for inserting individual ones into said bridge circuit, said switching means being actuated by said means for rotating said prism, said balanced bridge means being connected to said means for adjusting the openings so that upon switching in a different potentiometer causing bridge unbalance the driving means for adjusting the openings is energized, which last named driving means stops upon balancing of the bridge.

2. In spectrophotometric means having a thermopile and prism for refracting a spectrum of waves of energy thereon, opaque means between the prism and thermopile having an adjustable opening therein to control the rays impinging on the thermopile, driving means to turn the prism about its axis to cause the spectrum to scan over the opaque means and thermopile, means to adjust the size of the openings, bridge means controlling the opening adjusting means, alternate resistance means for forming one side of the bridge, and switch means to include one or the other of the resistance means in the bridge so that the openings may be adjusted by the insertion of preferred resistances.

3. In spectrophotometric means having a thermopile and prism for refracting a spectrum of waves of energy thereon, opaque means between the prism and thermopile having an adjustable opening therein to control the rays impinging on the thermopile, driving means to turn the prism about its axis to cause the spectrum to scan over the opaque means and thermopile, means to adjust the size of the openings, a bridge formed of two potentiometers controlling the means to adjust the openings, a series of potentiometers in parallel with one of the first named potentiometers capable of being set to different predetermined values of resistance and automatic switching means connected to and actuated by the driving means for the prism to periodically introduce singly into circuit one of the series of potentiometers so that the value of the bridge will be changed according to the program setting on the potentiometers and thus periodically energize the controlling means to adjust the openings and they will follow a prescribed program as the prism is turned.

4. In spectrophotometric means having a thermopile and a prism for refracting a spectrum of waves of energy, an adjustable slit for metering the energy falling on the thermopile between the prism and thermopile, a motor for turning the prism about its axis to cause the spectrum to scan the slit, a second motor to adjust the size of the slit, a balanced bridge circuit for controlling the second motor, a plurality of potentiometers in parallel connectable with one side of the bridge, commutator switching means connected to the shaft of the first motor to periodically switch the potentiometers in sequence into the bridge circuit and cause varying degrees of unbalance to cause the second motor to run until rebalanced and thus change the slit size dependent upon the settings on the potentiometers.

5. In spectrophotometric means having a thermopile and a prism for refracting a spectrum of waves of energy, an adjustable slit for metering the energy falling on the thermopile between the prism and thermopile, a motor for turning the prism about its axis to cause the spectrum to scan the slit, a second motor to adjust the size of the slit, a balanced bridge circuit for controlling the second motor, a plurality of potentiometers in parallel connectable with one side of the bridge, commutator switching means connected to the shaft of the first motor to periodically switch the potentiometers in sequence into the bridge circuit and cause varying degrees of unbalance to cause the second motor to run until rebalanced and thus change the slit size dependent upon the settings on the potentiometers, electronic timing means, pulse generating means also driven by the first motor to trigger the energization of the second motor.

6. In spectrophotometric means having a thermopile and a prism for refracting a spectrum of waves of energy, an adjustable slit for metering the energy falling on the thermopile between the prism and thermopile, a motor for tuning the prism about its axis to cause the spectrum to scan the slit, a second motor to adjust the size of the slit, a balanced bridge circuit for controlling the second motor, a plurality of potentiometers in parallel connectable with one side of the bridge, commutator switching means connected to the shaft of the first motor to periodically switch the potentiometers in sequence into the bridge circuit and cause varying degrees of unbalance to cause the second motor to run until rebalanced and thus change the slit size dependent upon the settings on the potentiometers, and a plurality of tapped resistances in series between the parallel potentiometers and one end of the bridge to change the whole balance of the bridge in steps which remain in circuit for the full run.

7. In spectrophotometric means having a thermopile and prism for refracting a beam of energy into a spectrum, an adjustable slit for varying the amount of spectrum incident upon the thermopile, a first motor to turn the prism about its axis to scan the slit, a second motor to adjust the slit width, a control bridge for the second motor, an amplifier between the bridge and motor, a commutator switch driven by the first motor to sequentially change the balance of the bridge as the prism rotates to change the slit width according to a preset program.

8. In spectrophotometric means having a thermopile and prism for refracting a beam of energy into a spectrum, an adjustable slit for varying the amount of spectrum incident upon the thermopile, a first motor to turn the prism about its axis to scan the slit, a second motor to adjust the slit width, a control bridge for the second motor, an amplifier between the bridge and motor, a commutator switch driven by the first motor to sequentially change the balance of the bridge as the prism rotates to change the slit width according to a preset program, electronic timing means, switch means between the amplifier and the second motor controlled by the timing means to apply the correcting adjustment at the desired moment.

9. In spectrophotometric means having a thermopile and prism for refracting a beam of energy into a spectrum, an adjustable slit for varying the amount of spectrum incident upon the thermopile, a first motor to turn the prism about its axis to scan the slit, a second motor to adjust the slit width, a control bridge for the second motor, an amplifier between the bridge and motor, a commutator switch driven by the first motor to sequentially change the balance of the bridge as the prism rotates to change the slit width according to a preset program, electronic timing means, switch means between the amplifier and the second motor controlled by the timing means to apply the correcting adjustment at the desired moment, means to manually balance the bridge, and switching means to permit either manual or automatic bridge adjustment to control the slits.

10. In spectrophotometric means having a thermopile and prism for refracting a beam of energy into a spectrum, an adjustable slit for varying the amount of spectrum incident upon the thermopile, a first motor to turn the prism about its axis to scan the slit, a second motor to adjust the slit width, an amplifier connected to the thermopile, balancing circuit means between the thermopile and amplifier, a control bridge for the second motor, a commutator switch driven by the first motor to sequentially change the balance of the bridge as the prism is rotated to vary the slit width according to a program, shutter means to cut off the energy flow to the prism during slit adjustment and means to bring to zero the balancing circuit in the thermopile output.

11. In spectrophotometric means having a thermopile and prism for refracting a beam of energy into a spectrum, an adjustable slit for varying the amount of spectrum incident upon the thermopile, a first motor to turn the prism about its axis to scan the slit, a second motor to adjust the slit width, an amplifier connected to the thermopile, balancing circuit means between the thermopile and amplifier, a control bridge for the second motor, a commutator switch driven by the first motor to sequentially change the balance of the bridge as the prism is rotated to vary the slit width according to a program, shutter means to cut off the energy flow to the prism during slit adjustment, means to bring to zero the balancing circuit in the thermopile output, and means to apply test signals of different strengths to the amplifier input at any time.

12. In spectrophotometric means, a source of radiation, a prism receiving rays therefrom and refracting the same into a spectrum, thermopile means to receive rays within the spectrum, opaque means having an adjustable opening therein interposed between the prism and the thermopile to meter the rays therethrough, means to cause relative motion between the prism and the thermopile so that the spectrum will scan the thermopile, driving means for adjusting the size of the opening in the opaque means, balanced bridge means connected to the driving means, variable resistance means forming one arm of the bridge and being connected to and actuated by the means for causing relative motion between the prism and thermopile so that as the spectrum scans the thermopile the bridge balance will be changed and cause the opening size to vary.

13. In spectrophotometric means, having a thermopile and prism for refracting a spectrum of waves thereon, opaque means interposed between the thermopile and prism having an adjustable aperture therein to control the amount of energy passing to the thermopile, means for causing relative movement between the prism and the thermopile so that a spectrum of wave lengths will scan the thermopile, driving means to adjust the size of the aperture in the opaque means, balanced bridge means connected to the driving means, one arm of said bridge being formed of a plurality of potentiometers in parallel, switching means to connect one of the potentiometers into the bridge circuit at a time to change the bridge balance, depending upon the setting of the potentiometer included, and means for operating said switching means connected to and driven by the means for causing relative movement between the prism and the thermopile.

MAX D. LISTON.

REFERENCES CITED

The following references are of record in the file of this patent:

UNITED STATES PATENTS

| Number | Name | Date |
|---|---|---|
| 1,894,132 | Stone | Jan. 10, 1933 |
| 2,063,140 | Allison | Dec. 8, 1936 |
| 2,170,435 | Sweeney | Aug. 22, 1939 |
| 2,176,013 | Pineo | Oct. 19, 1939 |
| 2,218,357 | Pineo | Oct. 15, 1940 |
| 2,314,800 | Pineo | Mar. 23, 1943 |
| 2,404,064 | Heigl et al. | July 16, 1946 |